(12) United States Patent
Lefcourt et al.

(10) Patent No.: US 11,047,340 B2
(45) Date of Patent: Jun. 29, 2021

(54) INTEGRATED WARHEAD ESAD/MULTI-PULSE ROCKET MOTOR EISD DEVICE

(71) Applicant: Raytheon Company, Waltham, MA (US)

(72) Inventors: Adam I. Lefcourt, Tucson, AZ (US); John A. Meschberger, Sahuarita, AZ (US)

(73) Assignee: Raytheon Company, Waltham, MA (US)

(*) Notice: Subject to any disclaimer, the term of this patent is extended or adjusted under 35 U.S.C. 154(b) by 176 days.

(21) Appl. No.: 16/541,281

(22) Filed: Aug. 15, 2019

(65) Prior Publication Data

US 2021/0071621 A1 Mar. 11, 2021

(51) Int. Cl.
*F02K 9/96* (2006.01)
*F42B 15/01* (2006.01)
*F02K 9/94* (2006.01)
*F42B 15/00* (2006.01)
*F42C 15/00* (2006.01)

(52) U.S. Cl.
CPC ............... *F02K 9/96* (2013.01); *F02K 9/94* (2013.01); *F42B 15/00* (2013.01); *F42B 15/01* (2013.01); *F42C 15/00* (2013.01)

(58) Field of Classification Search
CPC .... F02K 9/96; F02K 9/94; F42B 15/00; F42B 15/01; F42C 15/00

USPC ......................................................... 102/200
See application file for complete search history.

(56) References Cited

U.S. PATENT DOCUMENTS

| | | | | |
|---|---|---|---|---|
| 8,291,691 | B2* | 10/2012 | Spear | F02K 9/80 60/250 |
| 10,197,611 | B2* | 2/2019 | Biggs | G01R 31/40 |
| 10,386,165 | B1* | 8/2019 | Levin | F42B 15/01 |
| 2008/0173004 | A1* | 7/2008 | Kuo | C06D 5/10 60/39.15 |
| 2011/0167794 | A1* | 7/2011 | Spear | F02K 9/28 60/254 |
| 2017/0336460 | A1* | 11/2017 | Biggs | G01R 31/54 |
| 2021/0071621 | A1* | 3/2021 | Lefcourt | F02K 9/94 |

* cited by examiner

*Primary Examiner* — Samir Abdosh
(74) *Attorney, Agent, or Firm* — Renner, Otto, Boisselle & Sklar, LLP (57) ABSTRACT

A multi-pulse propulsion system for a launch vehicle includes a multi-pulse rocket motor module, a launchable payload module, and a safety module that is electromechanically coupled to the multi-pulse rocket motor module and the payload module. The safety module includes at two sensors for detecting at least one environmental characteristic and/or event that is common to both the multi-pulse rocket motor module and the payload module, such that the safety module is configured to activate the multi-pulse rocket motor module and the payload module in response to the detected environmental characteristic and/or event.

20 Claims, 4 Drawing Sheets

INTEGRATED WARHEAD ESAD/MULTI-PULSE ROCKET MOTOR EISD DEVICE

FIELD OF THE INVENTION

The invention relates to multi-pulse propulsion systems for launch vehicles.

DESCRIPTION OF THE RELATED ART

Propulsion systems may be used in various applications and arranged on different launching platforms, such as any land, sea, air, or space vehicle that is suitable for launching a payload. The payload to be launched is dependent on the application. For example, military applications that use land vehicles, aircrafts, surface ships, or underwater vehicles may include deployable munitions. The launching platform may be a rocket carrying a warhead.

Propulsion systems that use multiple pulses may be particularly suitable for use in hypersonic applications. A multi-pulse propulsion system may include a multi-pulse rocket motor, which generates multiple discrete thrust events. An exemplary use would be accelerating a payload with multiple pulses and reaccelerating the payload by a final pulse, achieving control authority as the vehicle approaches critical proximity of a desired target. Using a multi-pulse propulsion system is advantageous in enabling both maneuverability and efficiency in launching a payload such as a warhead.

Conventional multi-pulse propulsion systems include Electronic Ignition Safety Device (EISD) architectures that include adding Electronic Safe and Arm Device (ESAD) functionality, such as for acceleration sensing or timers for arming and staging, for multiple pulses and the ignition events following thereafter. In conventional multi-pulse propulsion systems, the ESAD functionality is duplicated on a separate ESAD component of the warhead. Conventional multi-pulse propulsion systems may be disadvantageous in that the duplication of components accommodates a large volume in a volume-constrained system and adds overall cost to system. Still another disadvantage is that duplicate sensing systems may result in discrepancies when detecting various system conditions.

SUMMARY OF THE INVENTION

A weapon system that utilizes a multi-pulse propulsion system in a launch vehicle consists of a multi-pulse rocket motor module and a payload module. The system includes a safety module that is electromechanically coupled to the rocket motor module and the payload module for detecting common environments and event conditions that are used by different safety devices in each module. The safety module includes at least one sensor for detecting at least one condition, such as an environmental characteristic and/or event, that is common to both the rocket motor module and the payload module. The safety module is configured to activate the rocket motor module and the payload module in response to the detected environmental characteristic and/or event. The condition detection and activation of the modules is used for transition of each module to a next state in a functional sequence for each module.

Environmental characteristics or events that may be detected by the safety module include an acceleration, an arming distance, a voltage of an ignition, a disconnect of an umbilical connector, an amount of battery power, an application of logic power, an expiration of a motion or arming timer, and different transition states of the launch vehicle, such as a pre-launch acceleration state, a separation state, an arming state, and other intermediate states. Using the safety module to detect common conditions and activate both the payload module and the rocket motor module in response to the detected common condition is advantageous since a single device is used to detect the conditions and activate the modules. Providing the single device eliminates duplicate safety detection hardware in the system and the potential for inconsistent safety condition information being captured within the system. Thus, the weapon system using the safety module architecture described herein is more compact and efficient as compared with a conventional, individual safety module for the multi-pulse propulsion system and payload.

According to an aspect of the invention, a multi-pulse propulsion system for a launch vehicle includes a safety module that detects environmental characteristics and/or events that are common to both the multi-pulse rocket motor module and the payload module and activates a multi-pulse rocket motor module and a payload module in response to the detected environmental characteristic and/or event.

According to an aspect of the invention, a multi-pulse propulsion system for a launch vehicle includes a multi-pulse rocket motor module, a payload module, and a safety module that is electromechanically coupled to the multi-pulse rocket motor module and the payload module, and includes at least one sensor for detecting at least one environmental characteristic and/or event that is common to both the multi-pulse rocket motor module and the payload module. The safety module is configured to activate the multi-pulse rocket motor module and the payload module in response to the at least one detected environmental characteristic and/or event.

According to an embodiment of any paragraph(s) of this summary, the at least one sensor includes at least one of an accelerometer, a motion timer, a distance or proximity sensor, or a voltage detector.

According to an embodiment of any paragraph(s) of this summary, the safety module includes a processing module having a memory in which predetermined conditions for the at least one environmental characteristic and/or event are stored, and a processor that is configured to compare the detected environmental characteristic and/or event with a corresponding one of the predetermined conditions.

According to an embodiment of any paragraph(s) of this summary, the multi-pulse propulsion system includes a power circuit including at least one of an umbilical connector, a battery, or a logic power supply, wherein the at least one environmental characteristic and/or event includes at least one of i) a disconnect of the at least one umbilical connector, ii) a battery power of the battery, or iii) an application of logic power.

According to an embodiment of any paragraph(s) of this summary, the at least one sensor includes a voltage detector for detecting the disconnect of the at least one umbilical connector.

According to an embodiment of any paragraph(s) of this summary, the power circuit includes a firing capacitor.

According to an embodiment of any paragraph(s) of this summary, the at least one sensor includes a voltage detector, and wherein the at least one environmental characteristic and/or event includes a voltage of the firing capacitor.

According to an embodiment of any paragraph(s) of this summary, the multi-pulse propulsion system includes at least one stage that is separable from the multi-pulse propulsion system.

According to an embodiment of any paragraph(s) of this summary, the at least one characteristic and/or event includes state transitions of the multi-pulse propulsion system, and wherein the state transitions include a pre-launch acceleration state, a separation state, and an arming state.

According to an embodiment of any paragraph(s) of this summary, the state transitions further include a first motion timer state and first motion validation state that are between the pre-launch acceleration state and the separation state, and a stabilized state that is between the separation state and the arming state.

According to an embodiment of any paragraph(s) of this summary, the at least one sensor includes a distance or proximity sensor, and wherein the at least one environmental characteristic and/or event includes a predetermined distance at which the at least one stage is separable from the multi-pulse propulsion system.

According to an embodiment of any paragraph(s) of this summary, the at least one sensor includes a timer for separating the at least one stage from the multi-pulse propulsion system, and wherein the at least one environmental characteristic and/or event includes an expiration of the timer.

According to an embodiment of any paragraph(s) of this summary, the at least one sensor includes an accelerometer, and the at least one environmental characteristic and/or event includes an acceleration of the multi-pulse propulsion system.

According to an embodiment of any paragraph(s) of this summary, the at least one sensor includes a distance or proximity sensor and the at least one environmental characteristic and/or event includes a predetermined arming distance of the multi-pulse propulsion system at which the multi-pulse rocket motor module and the payload module are activated.

According to an embodiment of any paragraph(s) of this summary, the payload module includes a warhead.

According to another aspect of the invention, a multi-pulse propulsion launch method includes detecting at least one environmental characteristic and/or event that is common to both a multi-pulse rocket motor module and a payload module using a single safety module having a sensor, and activating both the multi-pulse rocket motor module and the payload module in response to the detected environmental characteristic and/or event.

According to an embodiment of any paragraph(s) of this summary, the method further includes activating the multi-pulse rocket motor module and the payload module if the detected environmental characteristic and/or event satisfies a predetermined condition of the environmental characteristic and/or event, or determining a failure in at least one of the multi-pulse rocket motor module and the payload module if the predetermined condition is not satisfied.

According to an embodiment of any paragraph(s) of this summary, detecting at least one environmental characteristic and/or event includes detecting at least one of a disconnect of an umbilical connector, an expiration of a motion timer, an acceleration, a minimum arming distance, or a voltage of a firing capacitor.

According to an embodiment of any paragraph(s) of this summary, detecting the at least one environmental characteristic and/or event includes detecting state transitions of the multi-pulse propulsion system, wherein the state transitions include a pre-launch acceleration state, a separation state, and an arming state.

According to an embodiment of any paragraph(s) of this summary, the method further includes separating at least one stage from the multi-pulse propulsion system in response to the detected environmental characteristic and or event.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in defense applications, such as in a hypersonic vehicle or any launch vehicle where space may be constrained. The multi-pulse propulsion system described herein may be implemented in a rocket that includes a multi-pulse rocket motor and carries a warhead. Other suitable applications may include different launching platforms or vehicles that include multi-pulse propulsion systems for launching a payload. A single safety module is electromechanically coupled to both the rocket motor and the warhead. The safety module includes sensing components for sensing or detecting environmental characteristics or events that are common to both the rocket motor and the warhead. The safety device provides information regarding the sensed conditions or events to initiation sources for both the rocket motor and the warhead.

Figure 1:
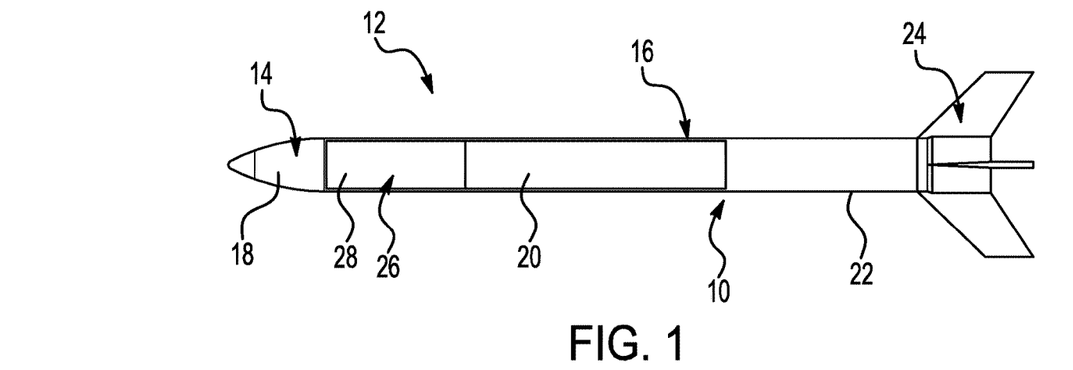
FIG. 1 shows a launch vehicle having a multi-pulse propulsion system in accordance with an exemplary embodiment of the present application.

Referring first to FIG. 1, a multi-pulse propulsion launch system 10 may be arranged in a launch vehicle 12, such as a hypersonic vehicle or a rocket. The launch vehicle 12 includes a payload module 14 having at least one launchable payload and a multi-pulse rocket motor module 16 that includes a multi-pulse rocket motor for providing at least two distinct propulsive impulses. Any suitable payload may be arranged in the payload module 14 and the payload module 14 may include a plurality of payloads. Exemplary payloads include satellites, space probes, cargo, or warheads. In an exemplary embodiment, the multi-pulse rocket motor may be a dual-pulse rocket motor.

The payload module 14 may be arranged in a shroud 18 located at the nose end of the launch vehicle 12 and includes any suitable payload electronics. The rocket motor module 16 may be arranged in a separable stage 20 of the launch vehicle 12. The launch vehicle 12 may have any suitable number of separable stages. For example, the launch vehicle 12 may include between two and five separable stages that are separable from the launch vehicle 12 at pre-determined times during travel of the launch vehicle 12. In an exemplary application, the launch vehicle 12 may include at least a first stage 22 and a second stage 20 in which the rocket motor module 16 is arranged. The launch vehicle 12 may include a first-stage propulsion device 24 that is arranged proximate the first stage 22 and opposite the shroud 18. The first-stage propulsion device 24 may include engines, boosters, tail fins, other thrusters, or any other suitable propulsion devices.

Figure 2:
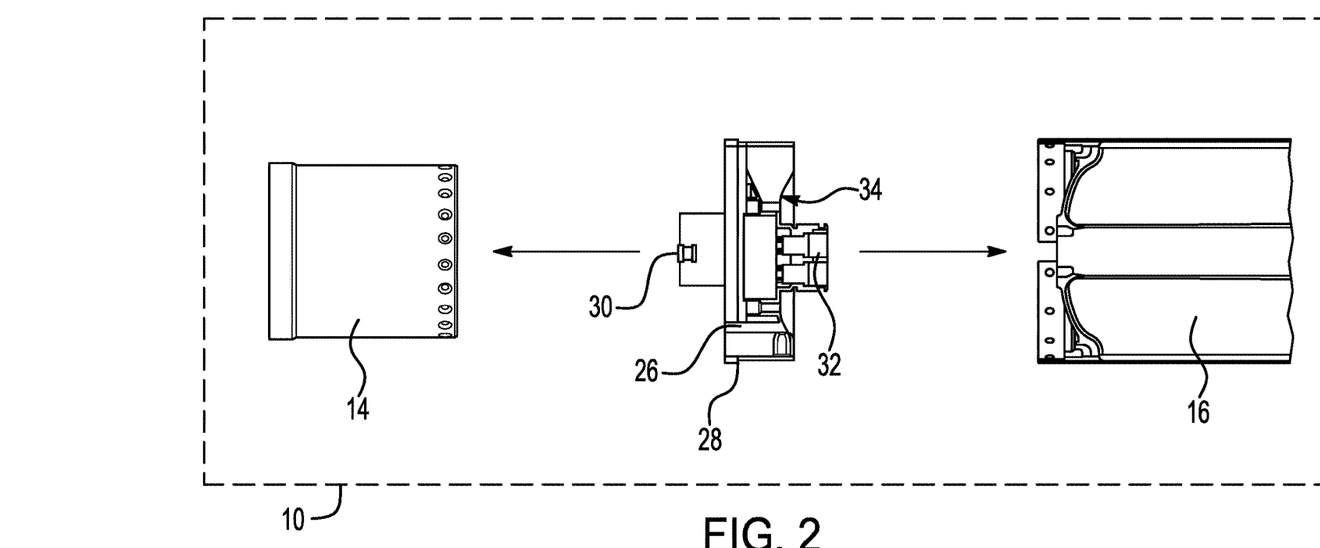
FIG. 2 shows a payload module, a multi-pulse rocket motor module, and a safety module of the multi-pulse propulsion system of FIG. 1.

Referring in addition to FIG. 2, the multi-pulse propulsion launch system 10 includes a safety module 26 that may be housed between the second stage 20 and the shroud 18. Both of the rocket motor module 16 and the payload module 14 are electromechanically coupled to the safety module 26 such that the safety module 26 mechanically interfaces with the rocket motor module 16 and the payload module 14, and is in electrical communication with the rocket motor module 16 and the payload module 14. The safety module 26 is a single component that is configured to detect common safety conditions that are used for the activation of both the payload module 14 and the rocket motor module 16. The detected conditions are then used by the safety module 26 to provide instructions or commands to both the payload module 14 and the rocket motor module 16.

The safety module 26 may be formed as a detachable hub 28 or other connecting body of the launch vehicle 12 that is coupled between adjacent parts of the launch vehicle 12. In other exemplary embodiments, the safety module 26 may be formed as a part of any hub or stage of the launch vehicle 12. The detachable hub 28 may be axially interposed between the payload module 14 and the rocket motor module 16. Multiple outputs 30, 32 may be arranged on the detachable hub 28 for communication with the payload module 14 and the rocket motor module 16. In an exemplary embodiment, a payload module output 30 may be arranged on a first axial side of the detachable hub 28 that is proximate the payload module 14, and a rocket motor module output 32 may be arranged on a second axial side of the detachable hub 28 that is opposite the first axial side and proximate the rocket motor module 16.

Figure 3:
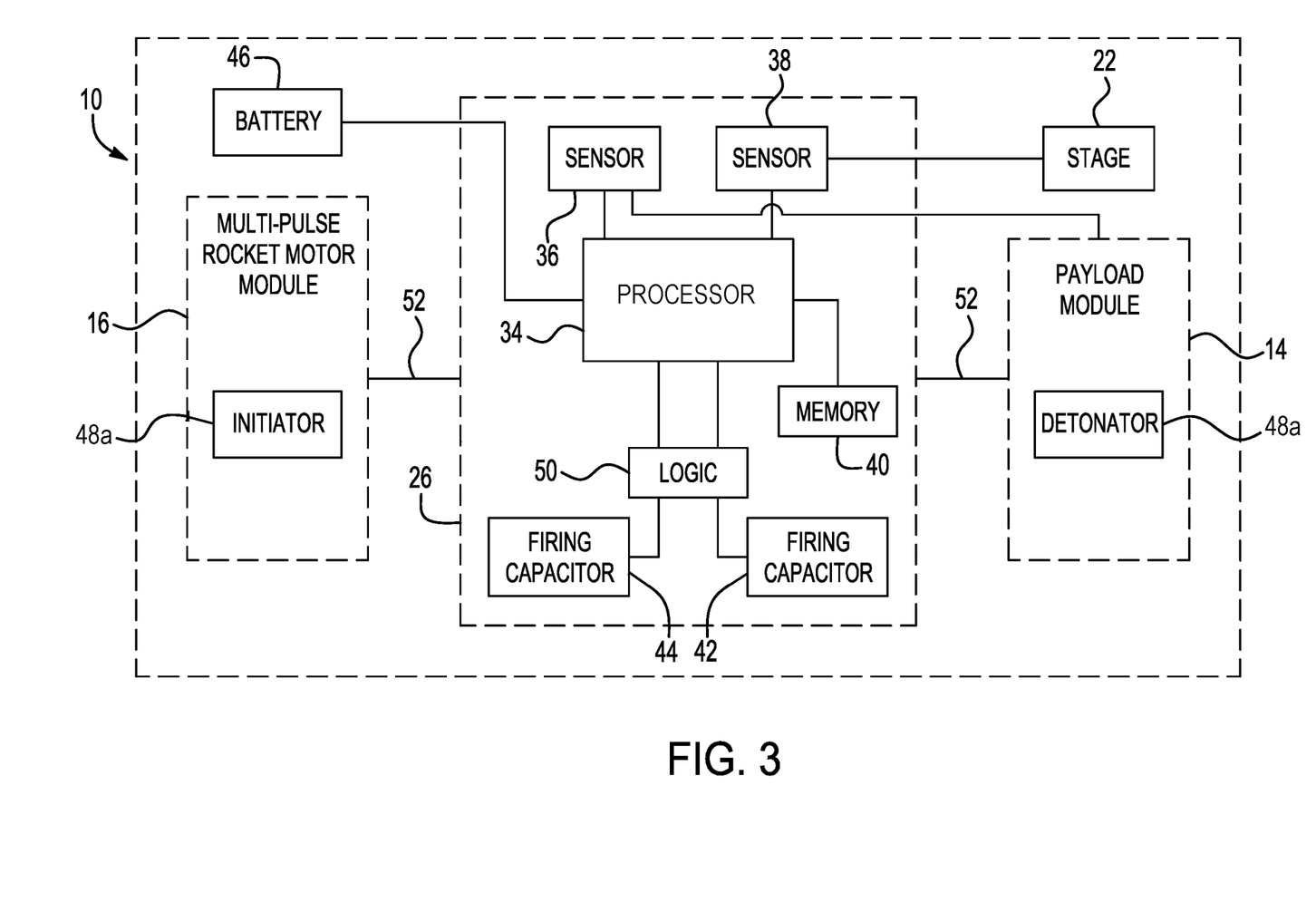
FIG. 3 shows an exemplary control system for the payload module, the rocket motor module, and the safety module of the multi-pulse propulsion system of FIG. 2.

Referring in addition to FIG. 3, the safety module 26 includes a processing module or processor 34 and at least two sensors 36, 38 for sensing or detecting at least two safety conditions, such as environmental characteristics and/or events that are common to both the rocket motor module 16 and the payload module 14 and is used to determine whether the rocket motor module 16 and the payload module 14 may be activated. Activation may include the module 14, 16 being moved or triggered to move into a next state in a launch sequence, such as staging, arming, firing, igniting, etc. Each of the rocket motor module 16 and the payload module 14 has an independent launch sequence and the safety module 26 is configured to communicate with both of the subsystems.

The safety module 26 includes a memory 40 that has stored data pertaining to predetermined environmental characteristics or events such that the processor 34 may compare the detected condition to the stored condition data to determine whether the detected condition meets a predetermined condition. For example, a particular mission or launch sequence for the launch vehicle 12 may have a minimum arming distance or a minimum acceleration of the launch vehicle 12 that must be reached before moving into another state of the launch sequence, such as reaching a predetermined arming distance before moving into an arming state. If the detected condition is deemed to be satisfactory, the safety module 26 determines that the multi-pulse propulsion launch system 10 is in a safe mode, the launch vehicle 12 is in an acceptable state for energetics operation, and the rocket motor module 16 may be activated and the payload module 14 may advance state toward initiation. If the detected condition does not meet the predetermined safety condition, the safety module 26 may determine that the multi-pulse propulsion launch system 10 is in a fail mode and the rocket motor module 16 and the payload module 14 will not be activated or the launch sequence may be stopped.

Many environmental characteristics or events may be detected and used by the safety module 26 to determine whether the launch vehicle 12 is in a safe operation mode. Different environmental characteristics or events may be continuously detected and the conditions may be detected at different points in time during an entire launch sequence for the launch vehicle 12. Examples of environmental characteristics include the launch vehicle 12 reaching a predetermined acceleration or reaching a predetermined separation distance at which one of the stages 20, 22, 28 may be separated from the launch vehicle 12. Other environmental characteristics include the launch vehicle 12 reaching a predetermined arming distance, a disconnection of a connector in the launch vehicle 12, or a minimum voltage of a firing capacitor being obtained before firing. Examples of detectable events include a stage separation, an expiration of a timer, such as an arming timer or a burn timer, or the launch vehicle 12 being in different launch states including a pre-launch acceleration state, a separation state, an arming state, and other intermediate states.

The processor 34 is communicatively coupled to each of the rocket motor module 16 and the payload module 14 such that the rocket motor module 16 and the payload module 14 are operated in response to the detected condition. Each of the rocket motor module 16 and the payload module 14 may have at least some similar or identical power control circuitry that is operable in response to a common condition. Firing capacitors 42, 44 may be arranged in the safety module 26. Any suitable circuitry may be used such as a battery 46, an initiation source, a detonator 48a or an initiator 48b, and a logic power source 50 communicatively coupled to the firing capacitors 42, 44. The rocket motor module 16 may include an initiator 48b and the payload module 14 may include a detonator 48a. The power control circuitry may be housed in the corresponding module 14, 16 or in the safety module 26 and is electromechanically connected to the module 14, 16 via any suitable hydraulic, electric, or pneumatic connectors. For example, at least one umbilical connector 52, or a plurality of umbilical connectors, may be connected between the modules 14, 16 and the safety module 26, and between different stages within the launch vehicle 12.

The processor 34 is configured to communicate with the initiator or detonator 48a, 48b of each of the rocket motor module 16 and the payload module 14 such that the processor 34 is able to use the detected conditions to activate multiple initiation sources. Using the single safety module to sense the common conditions is advantageous in that the same information may be detected and conveyed to both the rocket motor module 16 and the payload module 14 for controlling the launch sequences of the rocket motor module 16 and the payload module 14. Thus, fewer hardware components, such as additional connectors and sensors, are housed in the launch vehicle 12 as compared with conventional multi-pulse propulsion systems that use more than one detection device to separately detect the same conditions and independently control each of the rocket motor module 16 and the payload module 14.

The sensors 36, 38 are different types of sensors and any suitable sensor type may be used. The type of sensor may be dependent on the condition to be sensed. For example, the sensors 36, 38 may include at least one of an accelerometer, a motion timer, a distance or proximity sensor, or a voltage detector. For example, the environmental characteristic to be detected may include an acceleration of the launch vehicle 12, an accelerometer may be used to detect when the launch vehicle 12 has reached a predetermined acceleration for a particular mission or launch sequence. Suitable predetermined accelerations may be between 5 g and 6 g. In an exemplary application in which the environmental characteristic to be detected includes an arming distance of the launch vehicle 12, a distance or proximity sensor may be used. When the processor 34 has determined that the launch vehicle 12 has reached a predetermined acceleration or the minimum arming distance and that the launch vehicle 12 is thus in a safe mode, the processor 34 may activate the rocket motor module 16 and the payload module 14 to move into a next state in the respective launch sequence for the corresponding module.

The sensors 36, 38 may be used to detect disconnection of an umbilical connector 52. For example, an umbilical connector 52 may be used to provide electrical isolation prior to separation of a stage 20, 22, 28 from the launch vehicle 12 and the sensors 36, 38 may be configured to detect a disconnection of the umbilical connector 52. After the umbilical connector 52 is disconnected, the processor 34 may then determine that the launch vehicle 12 is in a safe mode and activate the rocket motor module 16 and the payload module 14 to move into a next state in the launch sequence. For example, the processor 34 may be configured to initiate a staging timer in response to determining that the umbilical connector is disconnected.

Detecting the disconnection of the umbilical connector 52 may include arranging a voltage detector as the sensor 36, 38. At another point in time during the entire launch sequence, the sensors 36, 38 or voltage detector may detect a voltage of the ignition, or a firing capacitor, as the environmental characteristic and/or event. For example, the voltage detector may be configured to detect whether the voltage of the ignition, e.g. the firing capacitor, is greater than or equal to a predetermined voltage, such as 500 volts, which is stored in the memory 40 as being the predetermined voltage at which the launch vehicle 12 is deemed to be in a safe mode for a particular mission. If the processor 34 determines that the detected voltage is greater than or equal to the predetermined voltage, the processor 34 determines that the launch vehicle 12 is in the safe mode and may send instructions to the rocket motor module 16 and the payload module 14 for activation or for moving into the next state in the launch sequence.

Other environmental characteristics or events that may be detected by the sensors 36, 38 include a battery power of the battery 46 in each module 14, 16, an application of logic power in each module 14, 16, an expiration of a timer for separating a stage from the launch vehicle 12, or a state transition of the launch vehicle 12. Different states may include the launch vehicle 12 being in a pre-launch acceleration state, a separation state in which a stage is separated from the launch vehicle 12, and an arming state in which the launch vehicle 12 has reached a predetermined arming distance and the multi-pulse propulsion launch system 10 is armed for firing. Other intermediate states may include a first motion timer state and first motion validation state that are between the pre-launch acceleration state and the separation state, and a stabilized state that is between the separation state and the arming state.

Figure 4:
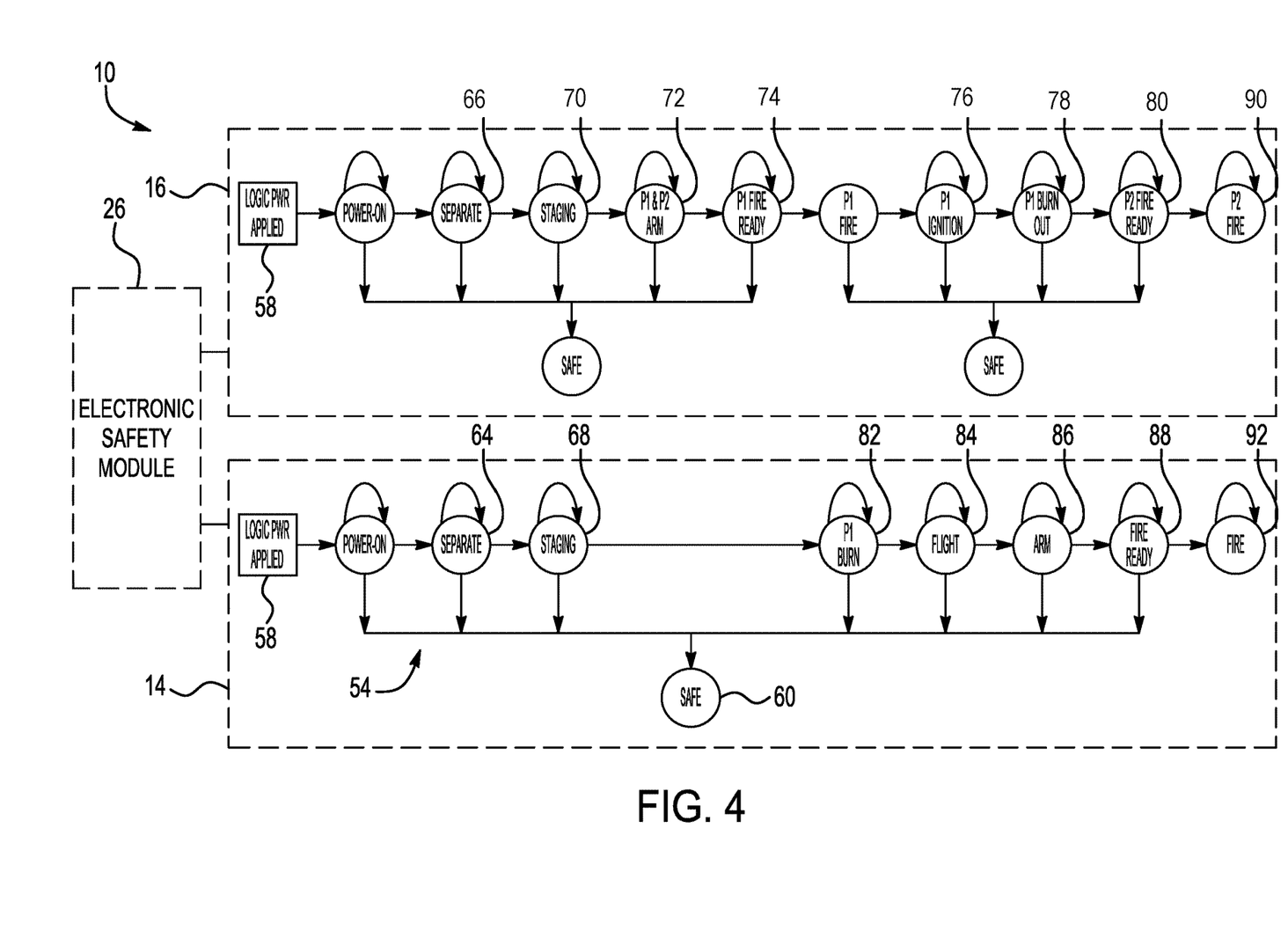
FIG. 4 shows exemplary launch sequences for the payload module and the rocket motor module of FIGS. 2 and 3.

Referring now to FIG. 4, a schematic drawing showing an operation of the safety module 26 with exemplary launch sequences 54, 56 for the payload module 14 and the rocket motor module 16 is shown. A first state 58 of the modules 14, 16 in each launch sequence 54, 56 is applying logic power to the respective module 14, 16 for powering the module 14, 16. The first condition that the safety module 26 may be used to detect is when logic power is applied. If the safety module 26 determines that logic power is applied, each module 14, 16 of the multi-pulse propulsion launch system 10 is determined to be in a safe mode 60, 62. After the corresponding module 14, 16 is determined to be in a safe mode 60, 62, the modules 14, 16 are activated to move into the next state in the corresponding launch sequence 54, 56. If the safety module 26 determines that logic power is not applied in at least one of the modules 14, 16, the safety module 26 may determine that the module 14, 16 is in a fail mode and one or both module 14, 16 may not be activated to move into the next state in the launch sequence 54, 56.

After determining that the multi-pulse propulsion launch system 10 is in the safe mode 60, 62, the modules 14, 16 are activated to move into a separation state 64, 66. In the separation state 64, the safety module 26 may be used to validate battery power for the power circuitry in each module 14, 16. When the battery power is validated, the modules 14, 16 are determined to be in the safe mode 60, 62 and a separation signal may be sent by the safety module 26 to the modules 14, 16 such that the modules 14, 16 move to a staging state 68, 70 in which one of the stages may separate from the launch vehicle 12. When in the staging state 68, 70, the safety module 26 may detect when a staging timer has expired, such that the modules 14, 16 are determined to be in the safe mode 60, 62. The rocket motor module 16 may then be activated to move into an arming state 72 at which a first pulse P1 and a second pulse P2 are armed. If the safety module 26 determines that at least one of the modules 14, 16 is not in the safe mode 60, 62 at any point during the launch sequences 54, 56, the multi-pulse propulsion launch system 10 may be determined to be in the failure mode and the launch sequences may be stopped.

After the first pulse P1 and the second pulse P2 are armed and the rocket motor module 16 is determined to be in the safe mode 62, the rocket motor module 16 moves into a first pulse pre-firing state 74 of the launch sequence 56 at which the first pulse P1 is triggered and fired. After the first pulse P1 is fired, the rocket motor module 16 and the rocket motor module 16 is determined to be in the safe mode 62, the rocket motor module 16 is activated to move into a first pulse P1 ignition state 76 at which a first pulse burn timer is activated and the first pulse P1 is accelerated. The rocket motor module 16 then moves into a first pulse P1 burnout state 78 of the launch sequence 56. The safety module 26 may be used to detect the expiration of the first pulse burn timer and a deceleration to determine when the rocket motor module 16 is in the safe mode 62 such that the safety module 26 activates the rocket motor module 16 to move into a second pulse P2 pre-firing state 80.

During the first pulse P1 burnout state 78 of the rocket motor module 16, the safety module 26 is also used to activate the payload module 14 in a first pulse P1 burn state 82. The safety module 26 is used to detect when the launch vehicle 12 has transitioned to the separation state 64, 66 and activates each of the rocket motor module 16 and the payload module 14 when the state transition is detected. When the payload module 14 is determined to be in the safe mode 60 after the separation and the staging state 68, the payload module 14 moves into the first pulse P1 burn state 82. In the first pulse P1 burn state 82, an arming timer may be started and the safety module 26 may determine whether a minimum arming distance has been reached and when the arming timer is expired. When the safety module 26 has determined that the predetermined arming distance has been reached and the arming timer is expired, the payload module 14 is in the safe mode 60 and the payload module 14 may move into a flight state 84 at which the payload module 14 waits for an arming command.

The safety module 26 may be configured to provide the arming command to the payload module 14 in response to any detected condition, such as any of the environmental characteristics or events previously described. When the payload module 14 receives the arming command and moves into an arming state 86, the payload module 14 may be charged and the safety module 26 may be used to detect whether a predetermined firing voltage is reached. If the safety module 26 determines that the predetermined firing voltage is reached, the payload module 14 is in the safe mode 60 and moves into a pre-firing state 88. When the rocket motor module 16 is in the second pulse pre-firing state 80 and the payload module 14 is in the pre-firing state 88, the modules 14, 16 may both receive a firing command from the safety module 26 based on the detected conditions. When the firing command is received, the rocket motor module 16 moves to a second pulse P2 firing state 90 and the payload module 14 moves to a firing state 92 for launching the payload.

Using the safety module 26 ensures that both modules 14, 16 satisfy safety conditions during the respective launch sequences 14, 16 by detecting environmental characteristics and events that are common to both modules 14, 16. By arranging the safety module 26 to communicate with both modules 14, 16, each module 14, 16 receives the same information corresponding to the detected conditions such that a variation or error in the detected conditions is prevented. Providing the safety module 26 as a single device is further advantageous in reducing the amount of hardware and software components that are often duplicated in conventional launch systems that use multiple safety detection modules for operating the subsystems of the launch system.

Figure 5:
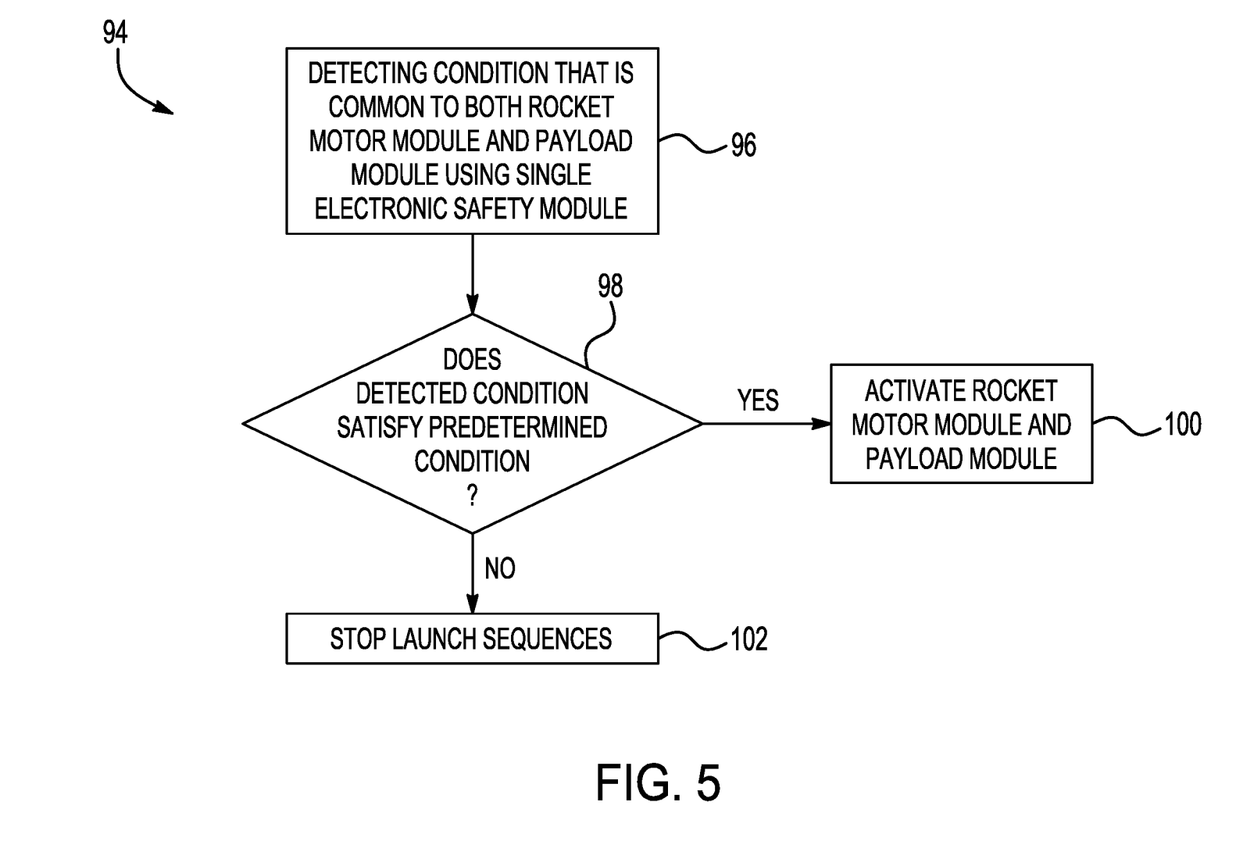
FIG. 5 shows a flow chart for a multi-pulse propulsion launch system using the multi-pulse propulsion system of FIGS. 1-4.

Referring now to FIG. 5, a multi-pulse propulsion launch method 94 using the multi-pulse propulsion launch system 10 (shown in FIGS. 1-4) is shown. Step 96 of the method 94 includes detecting at least one condition, such as an environmental characteristic and/or event, that is common to the rocket motor module 16 and the payload module 14 using the single safety module 26. Step 98 of the method 94 includes determining whether the detected condition meets a predetermined condition for a particular mission or launch sequence. Detecting the condition may include detecting at least one of a disconnect of an umbilical connector, an expiration of a motion timer, an acceleration, a minimum arming distance, a voltage of a firing capacitor, or state transitions of the launch vehicle 12, such as a pre-launch acceleration state, a separation state, and an arming state.

As shown in FIG. 3, step 98 includes using the processor 34 to compare the detected condition to a condition that is stored in the memory 40 of the safety module 26 and pertains to the particular mission or launch sequence. For example, the stored data may pertain to a minimum arming distance, a minimum acceleration, or a minimum firing capacitor voltage. If the processor 34 determines that the detected condition satisfies the predetermined condition for the launch sequence, step 100 of the method may include activating the rocket motor module 16 and the payload module 14 in response to the detected condition. Activating the modules 14, 16 may include the module moving to a next state in the launch sequence. For example, step 100 may include separating at least one stage from the launch vehicle 12 in response to the detected environmental characteristic and/or event. If the processor 34 determines that the detected condition does not satisfy the predetermined condition, step 102 of the method 94 includes determining that the multi-pulse propulsion launch system is in a failure mode and the launch sequences for the modules may be stopped.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-pulse propulsion system for a launch vehicle, the multi-pulse propulsion system comprising:
   a multi-pulse rocket motor module;
   a payload module; and
   a safety module that is electromechanically coupled to the multi-pulse rocket motor module and the payload module, and includes at least one sensor for detecting at least one environmental characteristic and/or event that is common to both the multi-pulse rocket motor module and the payload module, wherein the safety module is configured to activate the multi-pulse rocket motor module and the payload module in response to the at least one detected environmental characteristic and/or event.

2. The multi-pulse propulsion system according to claim 1, wherein the at least one sensor includes at least one of an accelerometer, a motion timer, a distance or proximity sensor, or a voltage detector.

3. The multi-pulse propulsion system according to claim 1, wherein the safety module includes a processing module having a memory in which predetermined conditions for the at least one environmental characteristic and/or event are stored, and a processor that is configured to compare the detected environmental characteristic and/or event with a corresponding one of the predetermined conditions.

4. The multi-pulse propulsion system according to claim 1 further comprising a power circuit including at least one of an umbilical connector, a battery, or a logic power supply, wherein the at least one environmental characteristic and/or event includes at least one of i) a disconnect of the at least one umbilical connector, ii) a battery power of the battery, or iii) an application of logic power.

5. The multi-pulse propulsion system according to claim 4, wherein the at least one sensor includes a voltage detector for detecting the disconnect of the at least one umbilical connector.

6. The multi-pulse propulsion system according to claim 4, wherein the power circuit includes a firing capacitor.

7. The multi-pulse propulsion system according to claim 6, wherein the at least one sensor includes a voltage detector, and wherein the at least one environmental characteristic and/or event includes a voltage of the firing capacitor.

8. The multi-pulse propulsion system according to preceding claim 1 further comprising at least one stage that is separable from the multi-pulse propulsion system.

9. The multi-pulse propulsion system according to claim 8, wherein the at least one characteristic and/or event includes state transitions of the multi-pulse propulsion system, and wherein the state transitions include a pre-launch acceleration state, a separation state, and an arming state.

10. The multi-pulse propulsion system according to claim 9, wherein the state transitions further include a first motion timer state and first motion validation state that are between the pre-launch acceleration state and the separation state, and a stabilized state that is between the separation state and the arming state.

11. The multi-pulse propulsion system according to any claim 8, wherein the at least one sensor includes a distance or proximity sensor, and wherein the at least one environmental characteristic and/or event includes a predetermined distance at which the at least one stage is separable from the multi-pulse propulsion system.

12. The multi-pulse propulsion system according to claim 8, wherein the at least one sensor includes a timer for separating the at least one stage from the multi-pulse propulsion system, and wherein the at least one environmental characteristic and/or event includes an expiration of the timer.

13. The multi-pulse propulsion system according to claim 1, wherein the at least one sensor includes an accelerometer, and wherein the at least one environmental characteristic and/or event includes an acceleration of the multi-pulse propulsion system.

14. The multi-pulse propulsion system according to claim 1, wherein the at least one sensor includes a distance or proximity sensor and the at least one environmental characteristic and/or event includes a predetermined arming distance of the multi-pulse propulsion system at which the multi-pulse rocket motor module and the payload module are activated.

15. The multi-pulse propulsion system according to claim 1, wherein the payload module includes a warhead.

16. A multi-pulse propulsion launch method, the method comprising:
    detecting at least one environmental characteristic and/or event that is common to both a multi-pulse rocket motor module and a payload module using a single safety module having a sensor; and
    activating both the multi-pulse rocket motor module and the payload module in response to the detected environmental characteristic and/or event.

17. The multi-pulse propulsion launch method according to claim 16 further comprising:
    activating the multi-pulse rocket motor module and the payload module if the detected environmental characteristic and/or event satisfies a predetermined condition of the environmental characteristic and/or event, or determining a failure in at least one of the multi-pulse rocket motor module and the payload module if the predetermined condition is not satisfied.

18. The multi-pulse propulsion launch method according to claim 16 wherein detecting at least one environmental characteristic and/or event includes detecting at least one of a disconnect of an umbilical connector, an expiration of a motion timer, an acceleration, a minimum arming distance, or a voltage of a firing capacitor.

19. The multi-pulse propulsion launch method according to claim 16, wherein detecting the at least one environmental characteristic and/or event includes detecting state transitions of the multi-pulse propulsion system, wherein the state transitions include a pre-launch acceleration state, a separation state, and an arming state.

20. The multi-pulse propulsion launch method according to claim 16 further comprising separating at least one stage from the multi-pulse propulsion system in response to the detected environmental characteristic and/or event.

* * * * *